Figure 1:
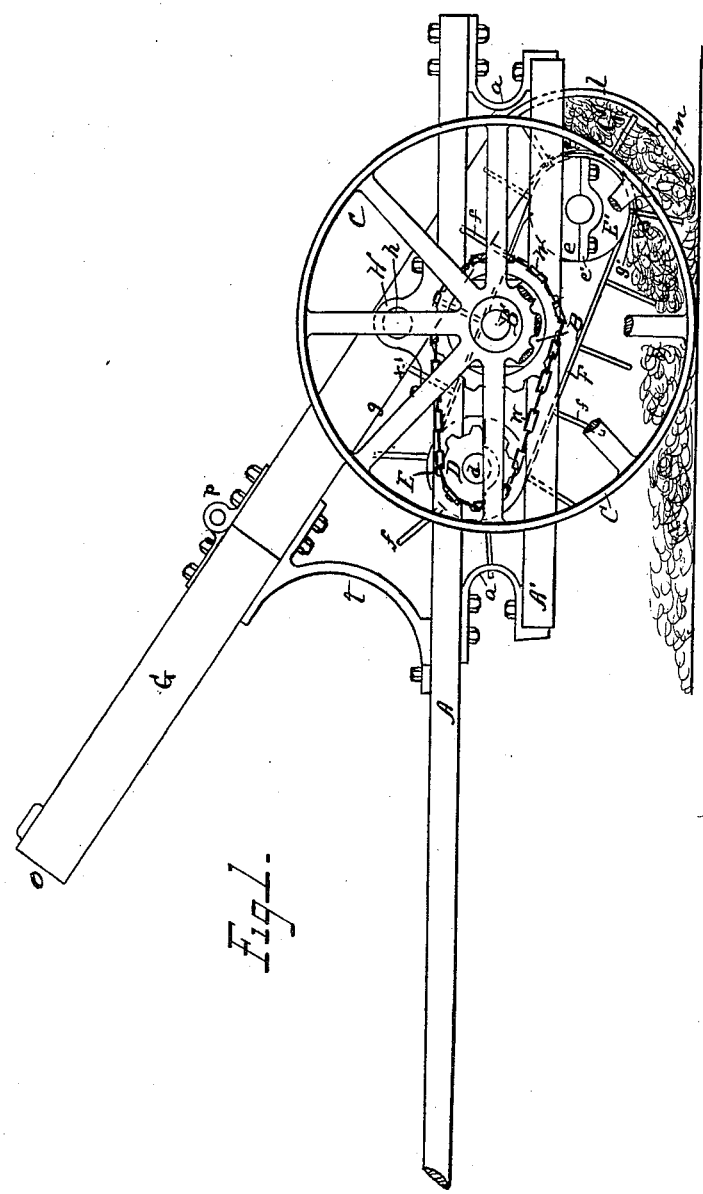

(No Model.)  2 Sheets—Sheet 1.

G. W. LE VIN.
HAY LOADER.

No. 256,710.  Patented Apr. 18, 1882.

Witnesses—  Inventor—

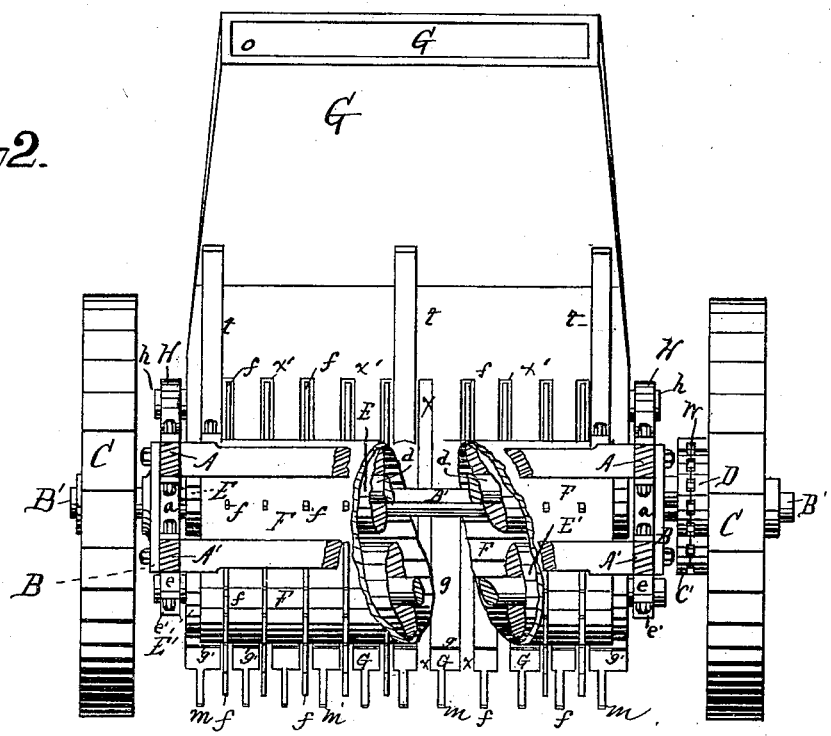

UNITED STATES PATENT OFFICE.

GEORGE W. LE VIN, OF CHICAGO, ILLINOIS, ASSIGNOR OF ONE-HALF TO MARSHALL BECK, OF SAME PLACE; SAID LE VIN AND BECK ASSIGNORS OF ONE-THIRD TO EWIN HOPKINS, OF SAME PLACE.

HAY-LOADER.

SPECIFICATION forming part of Letters Patent No. 256,710, dated April 18, 1882.

Application filed August 9, 1881. (No model.)

*To all whom it may concern:*

Be it known that I, GEORGE W. LE VIN, a citizen of the United States, residing at Chicago, in the county of Cook and State of Illinois, have invented a new and useful Improvement in Hay-Loaders, of which the following is a specification.

My invention relates to improvements in hay-harvesting machines in which raking-teeth for gathering hay from the swath operate in conjunction with a peculiar elevating mechanism for conveying the same to the wagon, and has for its objects to provide a simple and inexpensive machine which will facilitate the labor of gathering hay and dispense with much of the expense commonly incurred in the now requisite employment of men, horses, and the horse-rake. I attain these objects by the mechanism illustrated in the accompanying drawings, in which—

Figure 1 is a side view of the machine, and Fig. 2 a front view.

Similar letters refer to similar parts throughout the several views.

To the frame A A' is secured the axle B', upon which the wheel C works.

C' is a chain-pulley fixed to the wheel C.

E E' are drums hung to the frame A A', and rotate freely in their bearings $e$ $e'$.

D is a chain-pulley fixed to the drum E. W is a chain working over the pulleys C' D.

F is an endless apron or series of belts, carrying the elevating-fingers $f$ and working over the drums E E'.

G is the elevator-chute, held to the frame A by its trunnions $h$ and bearings H and standards $t$ or other suitable supports. The rear end, $l$, of the chute G, to which the raking-teeth $m$ are attached, is shaped, substantially as shown in Fig. 1, so as to accommodate the passage of the elevating-fingers when at work and for the purpose of preventing the escape of the accumulated and accumulating hay.

The rear end of the lower floor, $g$, of the chute G is curved, substantially as shown, so as to fit conveniently close to the apron F and drum E' for the purpose of keeping the hay from contact with the apron. The floor $g$ is slotted from the point $x$ to or about the point $x'$ for the purpose of allowing the elevating-fingers $f$ to pass longitudinally through the chute when at work, and for the additional purpose hereinafter set forth.

The chute G is preferably made in two sections, as shown, and provided with the hinge $p$, so that the upper section may be laid back upon the lower for convenience in transportation.

It will be seen by reference to the drawings that the apron F works upon a plane different to the plane described by the lower floor, $g$, of the chute G, being thus arranged so that the elevating-fingers $f$ of the apron F, passing around the drum E' and through the slots of the floor $g$ and toward the drum E, are gradually withdrawn from the hay until they become entirely removed from their contact therewith and from the chute G at or about the point $x'$.

My machine is designed to be attached to a wagon which receives and carries the elevated hay, and is connected thereto by the frame A or any other suitable means.

To more fully illustrate the practicability and utility of my machine, the manner of its operation is as follows: The wheel C being put in motion, the pulley C', by means of its connection with the pulley D by the chain W, actuates the drum E, which likewise, by means of the apron F, puts the drum E' in motion. The raking-teeth $m$ gathering the hay as the machine moves along, the fingers $f$ elevate the same up through the chute G to about the point $x'$, at which time such series of fingers disappear below the floor $g$.

Each successive series of fingers picking up the gathered hay, and in a like manner elevating the same to the point $x'$, and then being removed from contact, it is obvious that a continuous or almost continuous pressure is exerted upon the hay being carried through the chute, and, there being no impediment to its free passage through the same, it is easily deposited from the point of exit $o$ upon the receiving-wagon.

Having thus fully described my invention, what I claim as new, and desire to secure by Letters Patent, is—

In a hay-loader, the combination, with the frame A A', having brackets H and t, and chute G, having trunnions h h, and supported in said bearings or brackets, with rake-teeth m m attached to its rear curved end, of the shaft or axle B', carrying wheels C C, the pulleys C' D, chain W, drums E E', and apron F, having elevating-fingers f, and working on a different plane from that of the lower slotted floor, g, of the chute, substantially as shown and described.

GEORGE W. LE VIN.

Witnesses:
MARSHALL BECK,
E. HOPKINS, Jr.